United States Patent [19]

Cinzori

[11] Patent Number: 4,603,975
[45] Date of Patent: Aug. 5, 1986

[54] APPARATUS AND METHOD FOR NIGHTTIME AND LOW VISIBILITY ALIGNMENT OF COMMUNICATORS

[75] Inventor: Robert J. Cinzori, Santa Barbara, Calif.

[73] Assignee: Hughes Aircraft Company, Los Angeles, Calif.

[21] Appl. No.: 373,075

[22] Filed: Apr. 29, 1982

Related U.S. Application Data

[63] Continuation of Ser. No. 130,637, Mar. 17, 1980.

[51] Int. Cl.⁴ .................. G01B 11/26; G01C 1/00; H04B 9/00
[52] U.S. Cl. .................. 356/152; 455/606; 455/617
[58] Field of Search .............. 356/141, 152; 455/606, 455/617

[56] References Cited

U.S. PATENT DOCUMENTS

| | | | |
|---|---|---|---|
| 2,153,709 | 4/1939 | Bournisien | 455/606 |
| 2,982,859 | 5/1961 | Steinbrecher | 455/617 |
| 3,504,182 | 3/1970 | Pizzurro et al. | 356/4 |
| 3,511,993 | 5/1970 | Smokler | 250/203 R |
| 3,699,341 | 10/1972 | Quillinan | 356/152 |
| 3,907,435 | 9/1975 | Roodvoets | 356/152 |
| 3,941,483 | 3/1976 | Ferrin | 356/152 |
| 3,943,360 | 3/1976 | Parkin | 356/152 |
| 4,039,825 | 8/1977 | Doyle | 356/152 |
| 4,158,885 | 6/1979 | Neuberger | 356/152 |

Primary Examiner—S. C. Buczinski
Attorney, Agent, or Firm—Ronald L. Taylor; Mark J. Meltzer; A. W. Karambelas

[57] ABSTRACT

A method and apparatus associated therewith for acquiring and maintaining a high quality communication by communication means of the type that includes a detector and focusing means for directing encoded incoming radiation to said detector. Means are provided for determining the location of said radiation upon said detector and for generating an electrical signal responsive to said location. Said electrical signal is applied to electroluminescent means so that there is produced for the user a pattern of illumination indicating the degree of alignment of said communication means with the incoming radiation.

9 Claims, 10 Drawing Figures

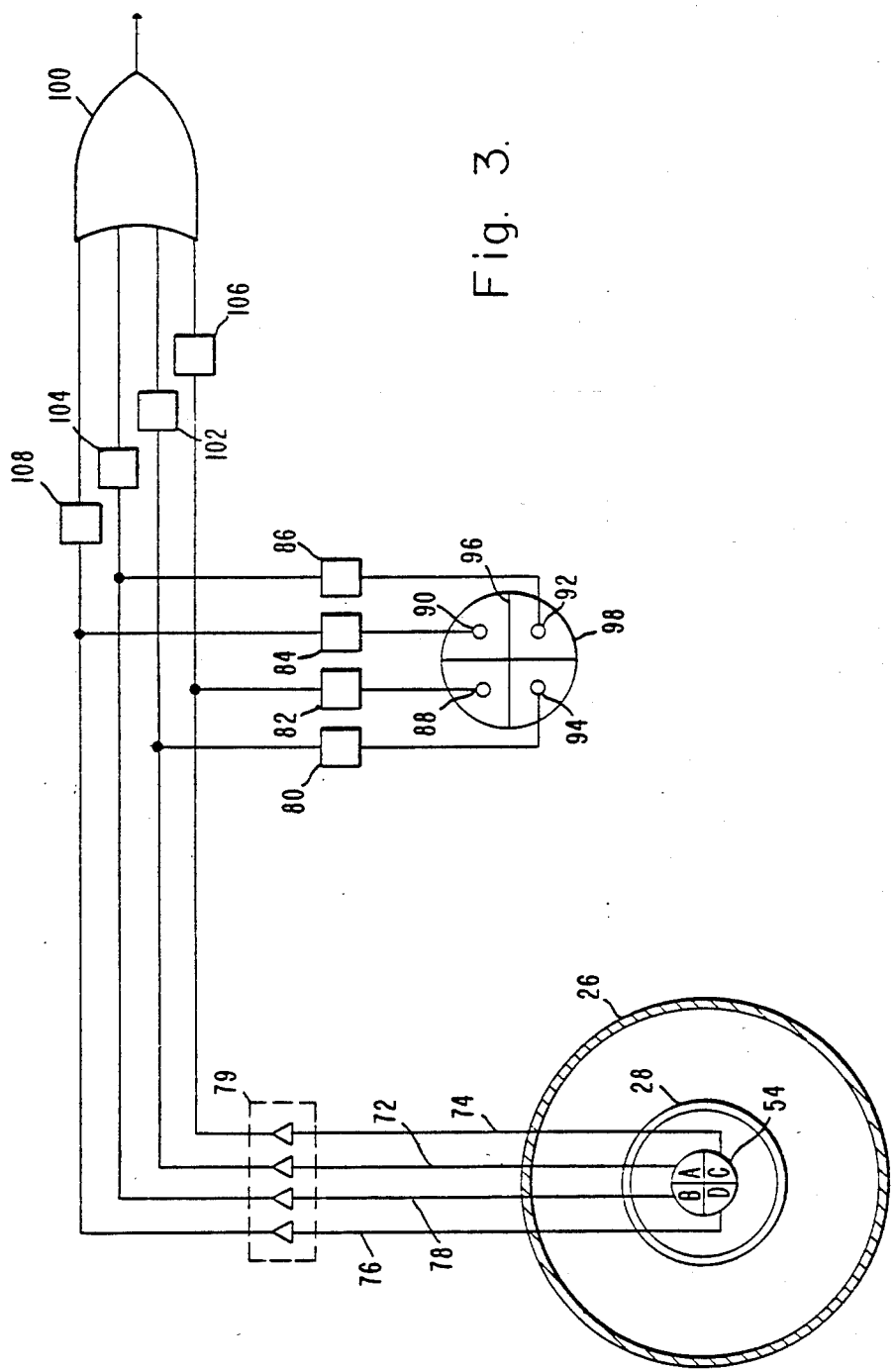

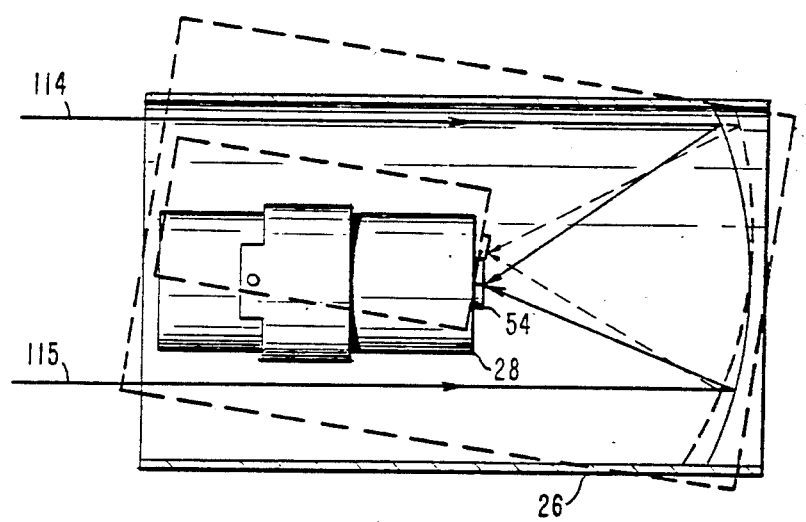
Fig. 5a.
Fig. 5b.
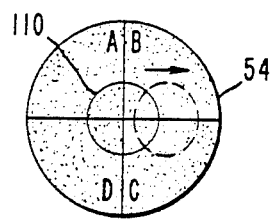
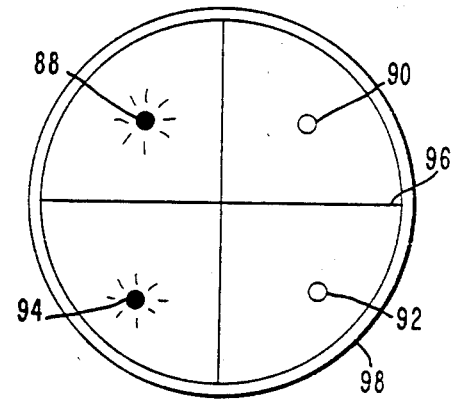
Fig. 5c.

APPARATUS AND METHOD FOR NIGHTTIME AND LOW VISIBILITY ALIGNMENT OF COMMUNICATORS

This is a continuation of application Ser. No. 130,637, filed Mar. 17, 1980.

TECHNICAL FIELD

The present invention relates to means for automatically aligning a receiver to an incoming laser transmission and, in particular, to means for achieving and maintaining good alignment between a pair of reciprocal tracking transmitter/receivers in conditions of low visibility.

BACKGROUND OF THE INVENTION

The need for covert communications, military and civilian, is both historic and ever-present. A communication may generally be considered covert if an intruder is unaware of its presence. In measuring covertness, one may consider many parameters such as: (1) probability of interception (intruder's ability to receive a portion of a communication of which he is aware); (2) jamming (intruder's ability to interfere or limit transmission of information); and (3) spoofing (intruder's ability to interject false information without it being recognized as false).

In attempting to avoid detection by an intruder, a system should attempt to minimize the above-named measures. Any communication system operates within a 5-dimensional space. Thus, a covert system may utilize up to five degrees of freedom to "hide" signal. The five dimensions available are time, frequency, and the three spatial dimensions. The veiling of the signal is commonly accomplished by (1) concentrating all signal energy into a small portion of the total volume of space in the hope that an intruder will not stumble across it or (2) moving the signal energy in some predetermined manner at a rapid rate through as much of the volume (of all five dimensions) as possible. In the latter instance, the intruder is required to observe the total spatial volume (rather than a small portion), thus incurring a reduction in receiver sensitivity. Though effective in many applications, such systems exploit only two of the above-named communication dimensions, frequency and time. In addition, the latter dimension is exploited in only one direction. The three spatial degrees of freedom remain unutilized for concealment due to the finite size of the receiver's antenna. Thus, these techniques are effectively limited to about one and one half dimensions of the five potentially available for hiding a communication.

Optical communications, on the other hand, maintain covertness through the concentration of signal energy into a small portion of space. Though not restricted solely to communication systems, it is well known that a laser system may conveniently achieve a very small energy volume relative to a comparable RF system. As optical systems also possess the ability to take advantage of the non-spatial communication dimensions, laser communication systems exercise all the degrees of freedom available to RF communication systems and more. As an example of the spatial covertness which may be achieved by a laser system, the (three dimensional) volume into which energy is directed by a 10 centimeter antenna at 37.5 GHz is 64,000 times as large as the energy volume produced by the same size antenna (10 centimeter diameter telescope) operating at 30,000 GHz (10 micrometer wavelength). An interceptor utilizing omnidirectional receiving antennas would be assured of location within the radiation field of such a transmitter, allowing the conduct of a systematic frequency search with reasonable assurance of detection. Contrariwise, due to the nature of laser communication, not only does the potential interceptor have to locate himself properly in frequency, time and space, he must also properly orient his antenna field-of-view to receive the transmitted energy. Thus, his search actually has seven degrees of freedom: the five previously discussed, plus the azimuth and elevation directions of his receiving antenna's field-of-view. This presents a huge, multifaceted problem. (An interceptor utilizing an optical heterodyne receiver has a field-of-view limited to approximately $2.4\lambda \div$ where $\lambda$ is the wavelength and d is the diameter of the antenna; thus, a 10 centimeter receiving antenna is limited to a field-of-view on the order of 0.014 degrees).

The very desirable directionality of the optical (laser) communication mode, which facilitates the concealment of optical transmissions in space, gives rise to the predictable difficulties of operation found to exist when the field-of-view communications are transmitted between transceivers (transmitter/receivers) having unstable platforms. This situation has recently arisen with regard to the development of lightweight, hand-held optical communicator systems. The possibility of developing a practical line-of-sight optical communicator operable over a range of 5 to 10 miles arose with the development of the gallium arsenide (GaAs) injection laser diode. [A hand-held optical communicator presently available is described in "Gallium Arsenide Laser Communicators for Hand-Held Voice or Fixed-Base Voice/Data Optical Communications" by Robert J. Cinzori (Procs. Sixth Conference on Laser Technology, Department of Defense (1974))]. Optimum covertness is achieved with such a system when the solid angle of the transmission in space is a minimum. The maintenance of a small angle of transmission leaves little margin for the errors incurred through receiver platform instability. The interrelationship of range and energy density imposes a physical limit (in addition to the security considerations which dictate minimal spatial distribution of a signal) upon the solid angle of the laser transmission. (It has been found that a communication range of seven miles may be achieved by a present day hand-held optical communicator having a transmission beamwidth of one and one-half degrees. This range is degraded to about one mile when the aperture is increased to four degrees).

The maintenance of transmission between two optical communicators of the type described above is disclosed in pending U.S. patent Ser. No. 95,178 filed on Nov. 16, 1979 by Richard A. Dye and titled "Self-Aligning Laser Communicator Utilizing Reciprocal Tracking". This application, which is the property of the assignee herein, discloses an automatic technique and apparatus therefor based upon the art of reciprocal tracking. The art disclosed in the pending patent application essentially utilizes a quadrature (four-piece) detector and associated circuitry which processes the information inherent in an unequal distribution of received energy upon such detector to continually reposition the reciprocal-tracking transceivers of the communicators by electro-mechanical means. This tracking technique and apparatus is effective provided a rough line-of-sight is maintained between the communicators so that incoming transmissions continue to fall with some distribution upon the quadrature detectors of the communicators. Unfortunately, the maintenance of a rough line-of-sight may be difficult in various important applications such as shipboard platforms, battlefields, etc., and nearly impossible to establish at night and in other low-visibility situations.

Once a "line-of-sight" is established at night, it may be subject to periodic "drop-out"—a result of the difficulty, if not impossibility, of attempting to hand-hold a communicator to within $\pm 1°$ accuracy. Thus, the "shaky" base provided by the human operator will often drive the device to the edge of communication—a suboptimal field-of-view alignment—whereby the automatic tracking apparatus of the Dye patent application must continually reposition the transceiver. This apparatus becomes useless once the line-of-sight is lost—a distinct possibility if such line-of-sight is on the edge of the communication.

SUMMARY OF THE INVENTION

It is therefore an object of the present invention to provide means for establishing and maintaining a good line of sight between a pair of optical communicators, one or more of which is hand-held or has an otherwise unstable base.

Another object of the present invention is to achieve the above object during periods of impaired visibility, such as nighttime, thereby increasing the utility of the hand-held communicator.

Still another object of the invention is to improve the quality of signal transmission and reception by enabling the receiving communicator to continually improve the line-of-sight therebetween.

These and other objects are achieved by the method and apparatus therefor disclosed herein. A distant transmission may be located and good quality maintained (avoiding receipt on the "edge" of the signal) by a listener utilizing a receiver having a detector according to the method of the present invention wherein the location of the point of incidence of said transmission upon said detector is first determined and an electrical signal generated in response thereto. This electrical signal is then applied to electroluminescent means comprising a plurality of electroluminescent devices arranged into a pattern corresponding to the geometry of the detector. The pattern of illumination generated thereby gives the listener an indication of the quality of the alignment of the receiver to the transmission and thereby provides continual guidance in the pointing of the receiver.

The determination of the location of the received energy upon the detector is facilitated by the incorporation of a detector comprised of a plurality of independent detector portions into the system. By the use of such a detector, as opposed to a unitary detector, each portion may correspond to a particular electroluminescent device of the aforementioned pattern.

Apparatus incorporating the present invention may include a plurality of electroluminescent devices each mounted in a segment (defined by the reticle)of the eyepiece of a sighting monocular. The sighting monocular is mounted with the receiver so that movement thereof alters the pointing direction of the receiver. Detector portions generate a plurality of electrical signals, each of which controls the luminance of one device and indicates to the listener the present quality of reception so that any necessary correction may be done by repointing and transmission "drop out" thus avoided.

Other and further aspects of the present invention will become apparent during the course of the following description and by reference to the accompanying drawings.

BRIEF DESCRIPTION OF THE DRAWINGS

Referring now to the drawings, in which like numerals represent like parts throughout:

FIG. 3 is an electromechanical schematic view of the line-of-sight detection system of the present invention;

FIG. 4b is a planar view of the detector of the receiver of FIG. 4a, showing the movement of the blur circle thereon as a result of the alignment shown in FIG. 4a;

FIG. 5a is a top view of a communicator for use with the present invention illustrating the misalignment of the receiver in the horizontal plane;

FIG. 5b is a planar view of the detector of the receiver of FIG. 5a showing the movement of the blur circle thereon as a result of the alignment shown in FIG. 5a; and FIG. 5c is a view of the monocular eyepiece as illustrated by the shifted blur circle of FIG. 5b.

DETAILED DESCRIPTION OF THE INVENTION

Figure 1:
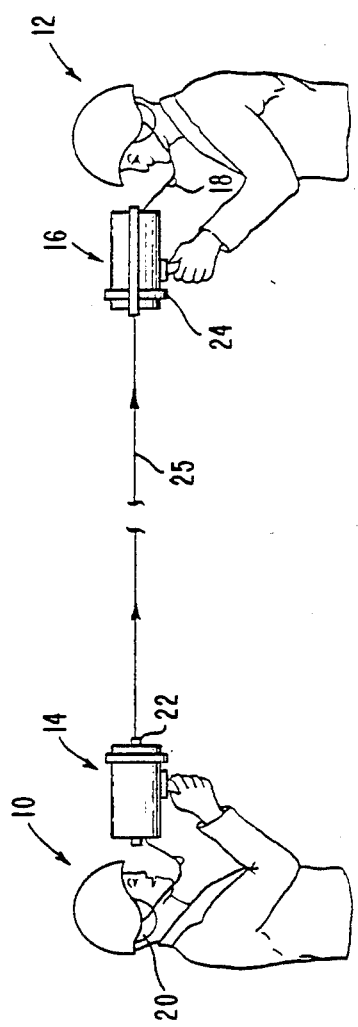
FIG. 1 presents a conceptual view of a field communication by means of a pair of optical communicators, each including the alignment apparatus of the present invention whereby a common line-of-sight therebetween is obtained.

FIG. 1 presents a conceptual illustration of communication between a first (speaking or transmitting) operator 10 and a second (receiving or listening) operator 12 by means of the identical optical communicators 14, 16, respectively. It is seen that the communicators 14, 16 present relatively lightweight, compact units which may be hand-held during operation. Such units have been fabricated, which are generally cylindrical in nature, having a transceiver (not shown in FIG. 1) diameter of 1.6 inches and a length of approximately 7 inches positioned inside an outer cylinder, shown in FIG. 1, having a 3.7 inch diameter and a length of 10 inches. The communicators 14, 16 utilize the monoculars 22, 24 to obtain a line of sight path 25 therebetween. Each operator is equipped with a headset having an earpiece 20, electrically coupled to the receiver electronics, and a microphone 18, electrically coupled to the transmitter electronics. Essentially, communication of voice is accomplished by transforming the voice of the transmitting operator 10 into a pulsed laser transmission over the optical path or ray 25. This "transformation" of voice or other data into a laser transmission is achieved by means of the modulation of the laser energy which travels over the path 25. The listening operator 12 receives the encoded laser transmission at the detector of his transceiver. The transmitted energy is converted into an electrical signal which, through standard transducer means, is "heard" after demodulation and decoding by the second operator 12 over his headset. Electronics appropriate for the modulation and demodulation of such a pulsed transmission is disclosed, for a multiple signal case, in U.S. Pat. No. 4,169,213 of R. A. Dye et al for "Apparatus and Method for Ordering Independent Signals", the property of the assignee herein. It is essential that the operators 10, 12 maintain both transceivers housed within the communicators 14, 16 upon approximately coincident optical paths for the effective transmission and detection of the transmitted (laser) energy and associated signal content. It is additionally imperative that the line-of-sight for path 25 be held and maintained as accurately as possible as a transmission on the "edge" of the field-of-view of the receiving communicator is subject to data loss through scintillation, e.m.i. and related effects. The process by which the transmission path 25 of a first transceiver is utilized to orient a second, receiving transceiver is known in the art as "reciprocal tracking". Pending U.S. patent application Ser. No. 95,178 of R. A. Dye for "Self-Aligning Laser Communicator Utilizing Reciprocal Tracking" discloses means for maintaining automatic self-alignment between the transceivers of the communicators 14, 16. The content of that application, which is also the property of the assignee herein, is hereby incorporated by reference into this application as if restated herein.

Figure 2:
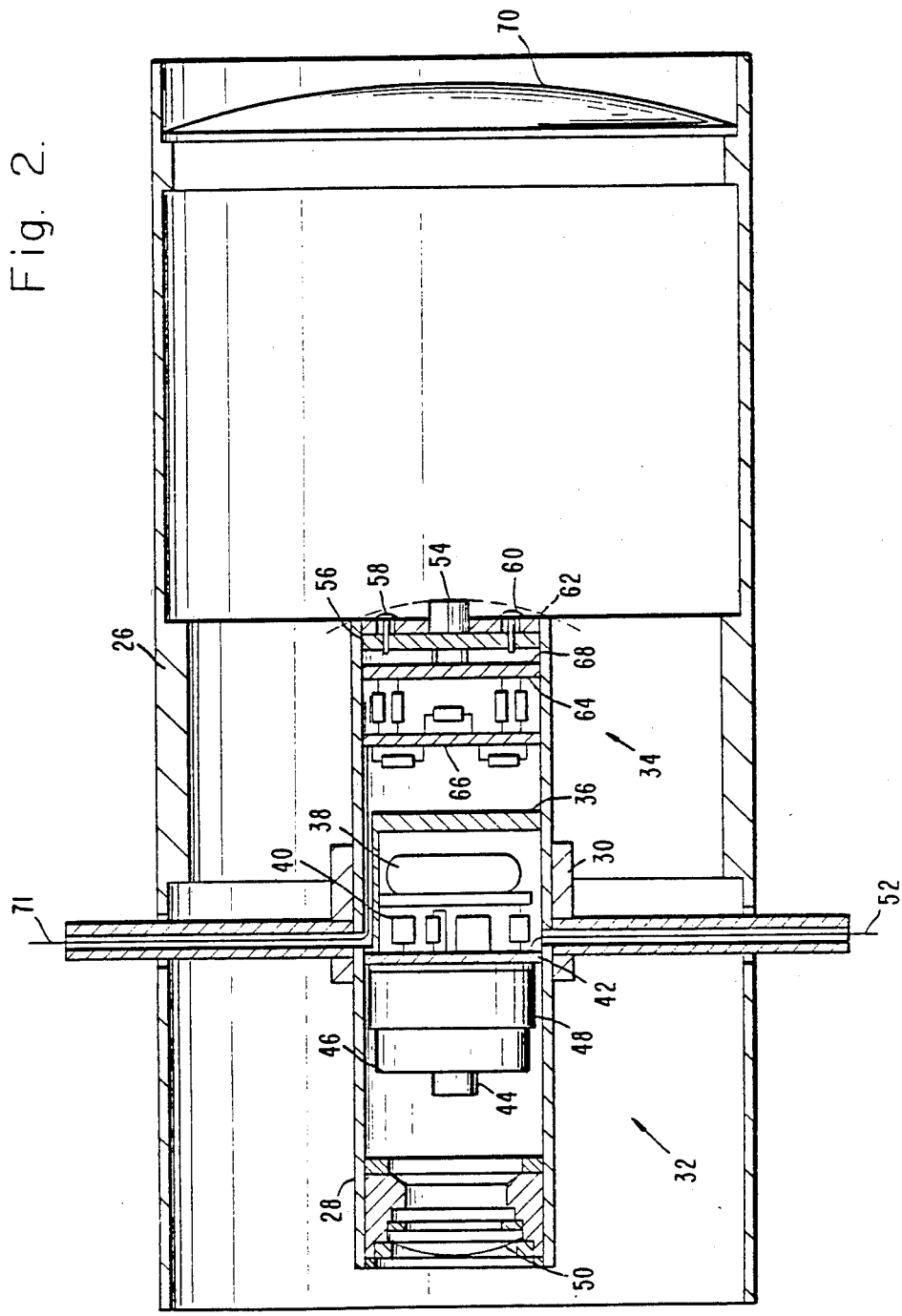
FIG. 2 is a partial sectional view of an optical communicator according to the present invention illustrating the laser transceiver 28 and its orientation within the outer cylinder 26.

The apparatus employed and disclosed in that application essentially comprises a cylindrical transceiver (transmitter-receiver) having an opposed laser transmitter and detector mounted within an outer cylinder by means of gimbaling apparatus responsive to electro-mechanical actuators. Referring to FIG. 2, the (hollow) interior of the (outer) cylinder 26 is shown with the transceiver 28, secured by means of a holder 30, within the (outer) cylinder 26. The (inner) cylinder or optical transceiver 28 is secured to the holder 30 by the tensioning of a pair of fastening screws.

The transceiver 28 may be seen in FIG. 2 to be divided internally into opposed transmitter and receiver sections 32, 34 separated by an internal partition 36. The transmitter electronics section 32 includes a ring up transformer 38 which provides power to pulser electronics 40 mounted on a printed circuit board 42. The aforementioned serves to drive a compact GaAs laser diode 44 which is mounted on a heat sink 46 and a holding fixture 48. A transmitter lens system 50 serves to maintain a predetermined solid angle of optical transmission. This angle, the significance of which has been mentioned, supra, depends upon the range and the degree of security desired. A conductor 52 provides electrical connection between the transmitter and the operator microphone.

The optical center of the transmitter lens system 50 is intersected by the coincident axes of the cylinder 26 and the cylindrical transceiver 28. Also, coincident therewith, is the center of the IR quadrature (i.e., four equal segments) detector 54 of the receiver section 34. The detector 54 may be any of a number of well-known devices chosen principally for efficiency at the wavelength of interest. The selection of an appropriate detector technology hinges also upon signal-to-noise ratio considerations. For example, an avalanche detector is most desirable in low background noise applications, due to its internal current gain. Unfortunately, the current gain of an avalanche detector acts upon both signal and noise. Thus, while signal current is multiplied by a factor M (set by adjusting the dc bias level of the quadrature detector 54), the detector noise current, which is a function of the background return and detector internal leakage current, is multiplied $M^d$, where d can vary from 1.5 to 2. Therefore, as the multiplication factor of the detector 54 is increased, the system S/N ratio is decreased. Generally, the limit of multiplication a system can tolerate is reached when the detector noise (with background) equals the receiver preamplifier noise. As the field-of-view is increased, the background noise begins to increase proportionately with the square thereof, and a background noise limiting situation is rapidly approached. A theoretical cross-over point, easily calculable, is then reached at which a PIN detector will provide a more favorable S/N ratio than a avalanche detector. The existence of such cross-over point is partially a reflection of the greater quantum efficiency of the PIN detector.

The quadrature detector 54 is mounted upon a washer 56. The washer 56 and the associated detector 54 are manually positioned by adjustment of the alignment screws 58, 60 to assure that the detector 54 remains within a predetermined focal spherical surface 62 when rotated in the elevation plane. The output of the detector 54 is applied to the preamplifier 64 mounted upon the printed circuit boards 66, 68. A composite conductor 71 provides electrical paths to the receiver electronics and to light emitting diodes mounted in the monocular eyepiece which provide a significant aspect of the present invention.

A spherical mirror 70 is positioned at the rear or closed end of the (outer) cylinder 26. The quadrature detector 54 is located at the focal plane 62 (approximately one-half the radius of curvature) of the mirror 70 and, as mentioned above, is constrained to the movement substantially within the spherical focal plane 62. This path assures that a uniform, minimum diameter, blur circle (i.e. image of laser light) will be focused upon the detector 54 at all times regardless of the relative orientations of the cylindrical transceiver 28 and the cylinder 26.

The operation of the automatic self-alignment mechanism is described in detail in the above-referenced patent application of Dye. Essentially, the current induced in each segment of the detector 54 is processed and then passed through differential amplifiers which determined the resultant ("push" or "pull") magnitude to be applied to electromechanical actuators located at 45 degrees between the mechanical axes of a gimbaling apparatus which holds and positions the transceiver 28.

FIG. 3 is an electro-mechanical schematic view of the circuitry of the present invention. The quadrature detector 54, divided into the labeled segments A, B, C and D, is mounted concentrically with the cross sections of the transceiver 28 and the outer cylinder 26. The conductors 72, 74, 76 and 78 transmit the currents independently generated by the incidence of portions of the incoming radiation upon the individual segments. (The four conductors may be gathered, along with the conductor connecting the detector to the receiver electronics, into the composite conductor 71.) The currents therein are fed into the preamplifier electronics 79 and then to four separate fast attack, slow decay pulse integrators 80, 82, 84 and 86 which produce the voltages that drive the LED's 88, 90, 92, 94 mounted in the quadrants defined by the reticle 96 of the monocular eyepiece 98. The communication or data signal is extracted at the receiver electronics after the combination of the four (A, B, C and D) quadrant outputs in the OR gate 100 (after thresholding the signals through the comparators 102, 104, 106 and 108 to ascertain whether or not signal, as opposed to background noise, has been received). The output of the OR gate 100 is then applied to the listener's receiver demodulator electronics which may be located in the headset electronics.

Figure 4A:
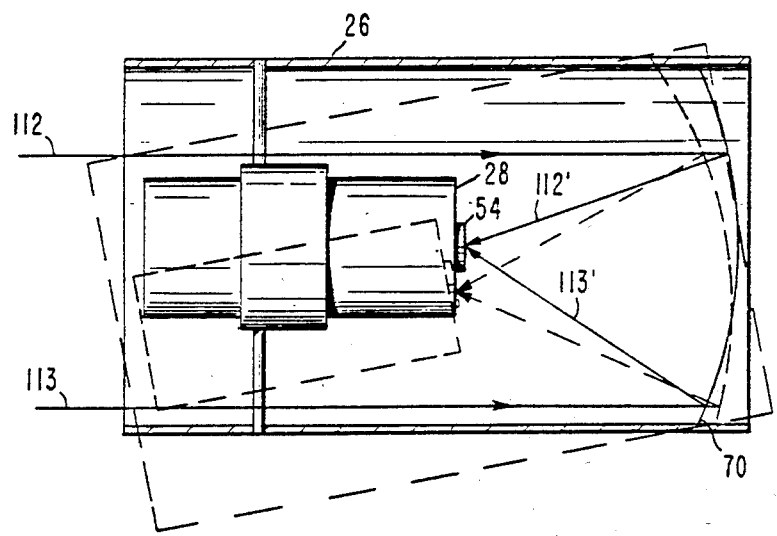
FIG. 4a is a side view of a communicator for use with the present invention illustrating the misalignment of the receiver in the vertical plane.
Figure 4B:
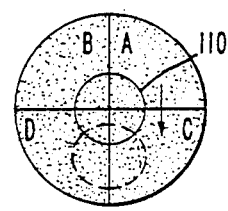
Figure 4C:
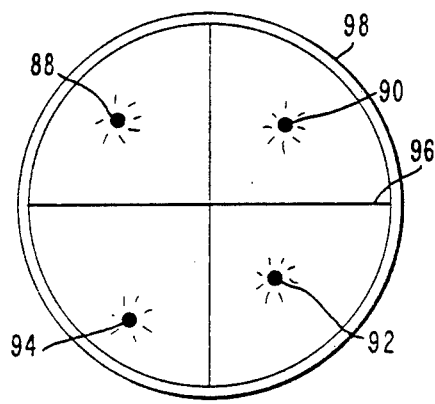
FIG. 4c is a view of the monocular eyepiece of the present invention.

The operation and mode of use of the present invention may be observed by examining the situations illustrated in FIGS. 4(a), (b) and (c) and 5(a), (b) and (c) with respect to the electro-mechanical diagram of FIG. 3. In FIG. 4(a) there is illustrated a side view (similar to the view of FIG. 2) of the transceiver 28 mounted within the outer cylinder 26. Initially, the blur circle 110, which represents the location of the incident radiation upon the surface of the quadrature detector 54 after its reflection off the spherical mirror 70, is assumed to be centered upon the detector (shown by the solid circle in FIG. 4b). The currents in the four conductors 72, 74, 76 and 78 and, therefore, the voltages applied to the LED's from the integrators 80, 82, 84 and 86, are equal. As a result, the four LED's 88, 90, 92 and 94 are equally illuminated as shown in FIG. 4(c). (The assumption that the blur circle 110 lies at the center of the detector 54, implies that rays of incident radiation such as the rays 112, 113 arrive at the communicator approximately perpendicular to the surface of the detector 54. As is well known in the field of optics, such rays, after reflection from the spherical mirror 70, will be focused upon the detector 54 at the center of the focal spherical plane.) The "fine tuning" tracking mechanism disclosed by Dye will not be activated to repoint the transceiver 28 and the longitudinal axis of the transceiver 28 will remain collinear with that of the outer cylinder 26.

Figure 4D:
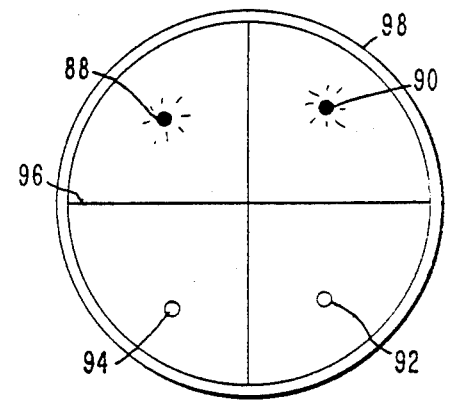
FIG. 4d is a view of the monocular eyepiece as illuminated by the shifted blur circle of FIG. 4b.

The dashed image of the communicator in FIG. 4a represents its position after an (inadvertent) amount of counterclockwise rotation has occurred. Such translation of position might occur as a result of a bouncy platform, commonly incurred with ship-to-ship or ship-to-shore communications, or might result from the fact that human pointing errors of less than ±1° are considered unrealistic. Such a small pointing error, although often admirable and satisfactory in many applications, can quickly bring a transmission to the "edge" when a narrow field-of-view is necessitated. The movement of the outer cylinder 26 to the dashed position produces a rotation of the mirror 70. The result of such movement is thus: rays of the incoming transmission lying above the transceiver 28, such as the ray 112, contact the mirror 70 (after rotation) at a point such that the distance traveled to the mirror 70 is shorter than before, as a result of which the ray 112 contacts the mirror's surface at a more acute angle than previously. The reflected ray, of course, identically contacts the mirror at a more acute angle, the net result of which is a greater divergence of the reflected beam 112 from the incident beam 112'. Likewise, portions of the transmission which lie below the transceiver 28 travel a greater distance before striking the mirror 70 than before. This results in a less acute angle of incidence than before and a smaller divergence of incident ray 113 from reflected ray 113'. The sum of these effects can be seen in FIG. 4b where there is indicated (by arrow and dashed circle) the downward rotation of the blur circle 110 on the surface of the detector 54 that accompanies the movement illustrated in FIG. 4a. Referring back to FIG. 3, this movement of the blur circle 110 results in a diminuition of the currents carried along the conductors 72, 78 and an increase in the currents along the conductors 74, 76. Consequently, the voltages applied to the LED's 88, 90 by the integrators 82, 84 will exceed those applied to the LED's 92, 94 by the integrators 86, 80 respectively. The corresponding state of the eyepiece 98 of the monocular, as shown in FIG. 4d, thus comprises a fully illuminated pair of upper half LED's 88, 90, and an unilluminated or lesser intensity pair of lower half LED's 92, 94. The operator, viewing such a pattern, is informed that he is now receiving a transmission "on the edge" and hence directed to rotate the communicator's outer cylinder 26 upward (in the direction of the illuminated LED's) to restore a good field-of-view with the transmitting communicator. In such a manner, easily learned by the listener, a nighttime communication can be kept on target so that transmission "drop out"—a very serious error in terms of nighttime corrections and/or compensation—can be avoided.

In FIG. 5a, a top view of a communicator according to the pending patent application of Dye, the outer cylinder 26 is seen to have become misaligned with respect to the incoming transmission as the result of an unintended clockwise rotation or torque. Once again optical effects, analogous to those described above, act upon the incident radiation to cause the ray 114 to the right of the transceiver 28 to diverge upon reflection from the mirror 70 less than before while the ray 115, arriving on the left hand side of the transceiver 28, diverges, upon reflection from the mirror, a greater amount than before. The net result of these effects is indicated in FIG. 5b by the arrow and dashed circle indicating the rightward movement of the blur circle 110 on the surface of the detector 54. As a result of this movement, the currents carried by the conductors 72, 74 increase while those carried by the conductors 76, 78 decrease. The relative current values result in a greater voltage output from the integrators 80, 82 than from the integrators 84, 86 and a corresponding increase in the illumination afforded by the LED's 88, 94 relative to that afforded by the LED's 90, 92. The pattern thereby superimposed upon the eyepiece of the monocular is shown in FIG. 5c to consist of a brightly illuminated pair of LED's 88, 94 to the left hand side of the reticle 96 and a dimly (if at all) illuminated pair of LED's 90, 92 to the right hand side of the reticle 96. Once again, the listener is notified that his hand movements and the like have moved the communicator off center and he is now at the "edge" and close to transmission drop out. To correct therefor, he must rotate the front of the communicator toward the illuminated half of the eyepiece (that is, counterclockwise) until the full complement of eyepiece LED's is illuminated as before.

Thus, it is seen that the present invention affords the user (listener) of a communication system of the nature described an easily understood and implemented apparatus and method for maintaining a "good" line-of-sight so that maximum transmission/reception quality can be maintained. The apparatus of the present invention which employs, inter alia, illuminative elements, solves critical nighttime communication problems by allowing the user a convenient, non-distracting means for analyzing the varying quality of communication and may be employed, in conjunction with the automatic tracking apparatus of Dye, to guard against the transmission drop out that would otherwise greatly degrade the nighttime usefulness of such apparatus.

In actual nighttime operation, the present invention might be employed in conjunction with an acquisition or "hailing" system such as that described in "GaAs Laser Communicator Acquisition System" by R. A. Dye and C. R. Berry (Santa Barbara Research Center Information Paper, March 1974) which determines the absence or presence of transmitting activity in the sector of interest. The system described in the above paper includes, inter alia, apparatus for performing scanning and filtering functions in conjunction with a "maximum likelihood" detection scheme whereby the presence of an active (transmitting) communicator in the sector of interest can be determined. Once such a determination has been made, the listener need only scan the horizon while observing the illumination pattern of the LED's of the monocular in accordance with the teachings herein to obtain (and maintain) a good (full reception) line-of-sight with the transmitting communicator.

Although the automatic self-alignment apparatus disclosed in the pending patent application of Dye provides "fine tuning" for the communicator system, it is evident that the transceiver 28 might be mounted stationary with respect to the outer cylinder 26. In this manner, the human operator may perform the entire tracking function, simply adjusting the orientation of the outer cylinder 26 as dictated by the LED portion. (It may be noted that the examples illustrated in FIGS. 4 and 5 did not employ automatic tracking to aid the realignment of transceivers.)

What is claimed is:

1. Apparatus for aligning a hand-held communication unit including a laser transmitter and a detector sensitive to incoming IR radiation containing encoded information, said communication means including focusing means for directing said incoming IR radiation to said detector, said apparatus comprising:
   (a) means for determining the location of said radiation upon said detector, and for generating an electrical signal responsive thereto; said detector comprising a plurality of independent detector portions;
   (b) electroluminescent means responsive to said electrical signal, said electroluminescent means comprising a plurality of electroluminescent devices arranged in a pattern coresponding to the geometry of said detector, so that there may be illuminated thereby a pattern indicative of the location of said transmission upon said detector;
   (c) means for combining the electrical signal from each detector portion to provide an output signal for further processing to extract said encoded information;
   (d) said apparatus further including a monocular having an eyepiece, said monocular being mounted with respect to said communication unit so that its movement directly affects the pointing direction of said unit; and
   (e) said eyepiece having a reticle defining a plurality of eyepiece segments, each of said segments having both an electroluminescent device and a detector portion associated therewith.

2. The apparatus of claim 1 in which said detector comprises an IR quadrature detector.

3. A method for aligning a communication means having a detector to incoming IR radiation during conditions of low visibility comprising the steps of:
   (a) receiving said IR radiation upon said detector, said detector being separated into a plurality of independent detector portions;
   (b) determining the point of incidence of said IR radiation signal upon said detector;
   (c) generating an electrical signal in response to the location of said point of incidence;
   (d) arranging a plurality of electroluminescent devices into a pattern in a monocular corresponding to the geometry of said detector;
   (e) engaging said monocular to said communication means so that movement of the monocular produces a corresponding movement of said communication means;
   (f) applying said electrical signal to said plurality of electroluminescent devices so that selected devices are illuminated in said monocular in response to the location of said IR radiation upon said detector;
   (g) pointing said communication means in response to the illumination of said devices; and
   (h) generating humanly perceptible information from the IR radiation.

4. The method defined in claim 3 further characterized in that the location of the point of incidence of radiation upon said detector is determined by separating said detector into a plurality of independent detector portions and generating a corresponding plurality of independent electrical signals in response thereto, the relative magnitudes of said signals serving as an indication of the location of said point of incidence.

5. The method defined in claim 4 characterized by the additional steps of:
   (a) arranging the plurality of independent detector portions into a pattern; and
   (b) arranging said plurality of electroluminescent devices into a corresponding pattern in the monocular.

6. The method defined in claim 5 characterized by the additional steps of:
   (a) locating said plurality of electroluminescent devices in the eyepiece of said monocular.

7. A method for receiving an encoded communication at night by aligning a communicator having a detector to incoming IR radiation, said detector being separated into a plurality of independent detector portions, comprising the steps of:
   (a) scanning an area by looking through a monocular connected to said communicator so that said IR incoming radiation falls upon said detector;
   (b) generating an electrical signal in response to the presence of said IR radiation upon said detector;
   (c) arranging a plurality of electroluminescent devices in the field of view of said monocular in a geometrical pattern generally corresponding to the geometrical pattern of said detector portions;
   (d) applying said electrical signal to selectively activate said electroluminescent devices so as to indicate the presence of said radiation and the direction of its source; and
   (e) decoding the received communication and generating a humanly perceptable output thereof.

8. In an improved alignment apparatus for a reciprocal tracking hand-held laser communicator unit including a cylindrical transceiver having an oppositely disposed laser transmitter and detector for detecting a laser beam containing encoded information, the optical axis of said laser transmitter being collinear with the center of said detector, which comprises:

(a) an outer cylinder having an open and closed end;
(b) said closed end of said outer cylinder having a spherical, mirrored inner surface for focusing said laser beam onto said detector;
(c) means for mounting said cylindrical transceiver within said outer cylinder; and
(d) means for rotating said cylindrical transceiver relative to said outer cylinder,
the improvement which comprises:
(e) means for determining the location of said laser beam upon said detector, and for generating an electrical signal responsive thereto, said detector comprising a plurality of independent detector portions;
(f) a monocular mounted with respect to said communicator unit so that the user may look through the monocular to point the transceiver in the direction of the source of the encoded laser beam, said monocular including an eyepiece with a reticle thereon defining a plurality of segments generally corresponding with the geometry of said detector portions;
(g) electroluminescent means responsive to said electrical signal, said electroluminescent means comprising an electroluminescent device in each eyepiece segment adapted to be selectively energized as a function of the location of the laser beam on the detector to thereby illuminate a pattern in the field of view of the monocular to aid the user in centering the beam on the detector; and
(g) means for combining the electrical signal from each detector portion to provide an output signal for further processing to extract said encoded information.

9. The apparatus of claim 8 in which said detector comprises an IR quadrature detector.

* * * * *